United States Patent [19]
Harter

[11] Patent Number: 6,076,872
[45] Date of Patent: Jun. 20, 2000

[54] VACUUM MANIPULATING DEVICE

[75] Inventor: Leonhart Harter, Lossburg-Oberbrändi, Germany

[73] Assignee: J. Schmalz GmbH, Glatten, Germany

[21] Appl. No.: 09/163,442

[22] Filed: Sep. 30, 1998

[30] Foreign Application Priority Data

Sep. 30, 1997 [DE] Germany .................... 197 44 190

[51] Int. Cl.[7] ................................................ B66C 1/02
[52] U.S. Cl. .......................................... 294/64.1; 414/627
[58] Field of Search ................... 294/64.1, 64.3, 294/65; 414/627, 737

[56] References Cited

U.S. PATENT DOCUMENTS

| | | | |
|---|---|---|---|
| 2,995,359 | 8/1961 | Gulick | 294/64.1 |
| 3,743,340 | 7/1973 | Williamann | 294/64.1 |
| 5,934,723 | 8/1999 | Schmalz | 294/64.1 |

FOREIGN PATENT DOCUMENTS

| | | | |
|---|---|---|---|
| 590554 | 4/1994 | Japan | 294/64.1 |
| 493979 | 7/1992 | United Kingdom | 294/64.1 |

Primary Examiner—Dean J. Kramer
Assistant Examiner—Paul J. Chin
Attorney, Agent, or Firm—Jones, Tullar & Cooper, P.C.

[57] ABSTRACT

The present invention relates to a vacuum manipulating device with a suction device, which can be connected via a lifting hose with a device generating a vacuum and which, for creating a suction on an object to be lifted or transported, can be placed on the latter. The suction device includes a control valve device with an opening which can be unblocked and blocked for controlling the vacuum prevailing in the interior of the suction device. The control valve device has a control element, which unblocks or blocks the opening and can be pivoted or rotated in the one or the other direction which, in the non-actuated state, takes up a settable neutral position with a degree of opening corresponding to the setting. In order to be able to set a defined poise, the device in accordance with the present invention is embodied such, that the control element is prestressed against a force-guided movable component in such a way that in the non-actuated state it rests against the latter with a detent area.

The movable component is prestressed against an adjustable positive stop, which defines the degree of opening in the neutral position, and rests against the positive stop in the neutral position and when the control element is deflected in one direction. When the control element is deflected in the other direction, with its detent area the control element moves the movable component away from the positive stop against its prestress.

16 Claims, 5 Drawing Sheets

VACUUM MANIPULATING DEVICE

FIELD OF THE INVENTION

The present invention relates to a vacuum manipulating device with a suction device. The suction device can be connected via a lifting hose with a device generating a vacuum and which, for creating a suction on an object to be lifted or transported, can be placed on the latter. The suction device includes a control valve with an opening which can be unblocked and blocked for controlling the vacuum prevailing in the interior of the suction device. The control valve has a control element, which unblocks or blocks the opening and can be pivoted or rotated in the one or the other direction which, in the non-actuated state, takes up a settable neutral position with a degree of opening corresponding to the setting.

BACKGROUND OF THE INVENTION

A vacuum manipulating device of this type is known. The known device comprises a control element in the form of a pivotable control flap, which can be manually pivoted into the one or the other direction for unblocking, or respectively blocking an opening. In the non-actuated state of the control flap it should take up a defined position, which partially unblocks the opening, so that a defined poise is set by means of a suitable vacuum in the interior of the suction device and in the lifting hose. To take up this position, the control flap is prestressed by means of two springs acting in opposite directions, whose equilibrium defines the neutral position of the control flap and thus the poise.

However, in connection with this known vacuum manipulating device it has been shown to be disadvantageous in that the neutral position of the control flap depends on whether previously the control flap had been opened farther or closed farther. The cause of this is the frictional force acting between the control flap and a wall constituting the opening. Depending on the direction from which the control flap is pulled in the neutral position by the action of the two springs, the frictional force appearing here acts in the opposite direction. The poise, i.e. the neutral position of the control flap therefore is not unequivocally defined and cannot be reproducably attained.

A vacuum manipulating device, which is somewhat different from that noted above, is also known from European Patent EP 0 590 554 A1, wherein the opening, which can be unblocked, or respectively blocked by the control flap is always completely closed by the action of a single spring when the control flap is not actuated. The poise is created by a throttle device, which is separate from this and which acts on a further opening.

SUMMARY OF THE INVENTION

An object of the present invention is intended to improve a vacuum manipulating device of the type described at the outset in such a way, that the above described "hysteresis effects" when the control element takes up the neutral position (poise of the device) do not occur in the non-actuated state. The neutral position of the control element therefore should be independent of the direction in which the control element had been previously actuated.

This object is attained in connection with a vacuum manipulating device of the type mentioned, in that the control element is prestressed against a force-guided movable component in such a way that in the non-actuated state it rests against the latter with a detent area, that the movable component is prestressed against an adjustable positive stop, which defines the degree of opening in the neutral position, and rests against the positive stop in the neutral position and when the control element is deflected in one direction. In this way, when the control element is deflected in the other direction, with its detent area, the control element moves the movable component away from the positive stop against its prestress.

By means of the characteristics of the present invention that it is possible to achieve a neutral position of the control element, which is independent of the previous design of the control element, and therefore a defined poise of the suction device. Therefore the neutral position, or respectively the poise, can be preset by adjusting a positive stop in accordance with the weight of the suction device with or without the object held by suction and in accordance with the amount of poise in the non-actuated state.

The movable component can be prestressed in any arbitrary manner against the positive stop. However, in order to insure that the actuating forces for rotating or pivoting the control element are independent of the actually set neutral position, i.e. independent of the adjustment of the positive stop, it is proposed by a particularly advantageous further development of the present invention that the movable component is prestressed against the positive stop by means of a first spring, whose one end is fixed in place on the adjustable positive stop itself. In an advantageous manner the spring can be a helical tension spring.

The control element can also be prestressed in any arbitrary manner against the movable component. Since the neutral position of the movable component depends on the position of the positive stop, it has been shown to be advantageous if the control element is prestressed against the movable component by means of a second spring, and that one end of the second spring is fixed in place on the component itself. As already explained above in connection with the first spring, by means of this it is achieved that the actuating forces for pivoting the control element are essentially independent of the setting of the neutral position by means of the positive stop. The second spring can also be advantageously embodied as a helical tension spring.

The movable component could be displaceable in any arbitrary manner per se, for example displaceably guided in a longitudinal direction. However, it is suggested to pivotably hinge the movable component. In this case the detent area of the control element resting against the movable component, namely both in the neutral position as well as for moving the movable component away from the positive stop, exerts a pivot or lever moment on the pivotably hinged component. Here the pivotably hinged component preferably should be arranged in such a way that, when the component is pivoted away from the positive stop, lever conditions as unchanged as possible are prevalent because of the detent area of the control element. This is achieved in an advantageous manner in that the movable component is embodied as a pivot lever and is arranged in such a way that the contact point of the detent area of the control element on the pivot lever, the pivot point of the pivot lever, and the pivot or rotation point of the control element essentially are located on one line.

The pivotable or rotatable control element could be opened or closed, i.e. pivoted or rotated into the one or the other direction in any arbitrary manner per se; a rotatable handle, a pull or a push rod, an electrical adjustment device or the like could be used for this. In view of a simple operability of the control element it is proposed to provide a manually operable and pivotably hinged actuating lever.

The actuating lever then can act in an advantageous manner on the detent area of the control element.

If the control element has a pin-like protrusion projecting transversely with respect to the plane of the control element, which preferably also constitutes the detent area, the actuating lever can be formed in a particularly simple manner by a flat iron, which can be arranged parallel with the plane of the control element. In that case the actuating lever can rest with a longitudinal edge against the pin-shaped protrusion of the detent area or, in an advantageous further development, it can have an opening in the shape of an elongated hole, through which the pin extends and in which the protrusion can be displaced in the one or the other direction when the control element is deflected.

It has been furthermore shown to be advantageous if the pivot point of the movable component embodied as a pivot lever and the pivot point of the actuating lever coincide. In that case they can be held by the same bearing means.

For setting the neutral position, or respectively the poise of the suction device with or without an object held by suction, the adjustable positive stop is preferably adjustable in the pivot or rotation plane of the control element. Any arbitrary guidance, arresting or adjusting means could be provided for this per se. In a preferred manner, the positive stop can be displaced by a threaded spindle.

Further characteristics, details and advantages of the present invention will be noted from the drawings and the following description of a preferred embodiment of the present invention.

DESCRIPTION OF THE PREFERRED EMBODIMENT

Figure 2:
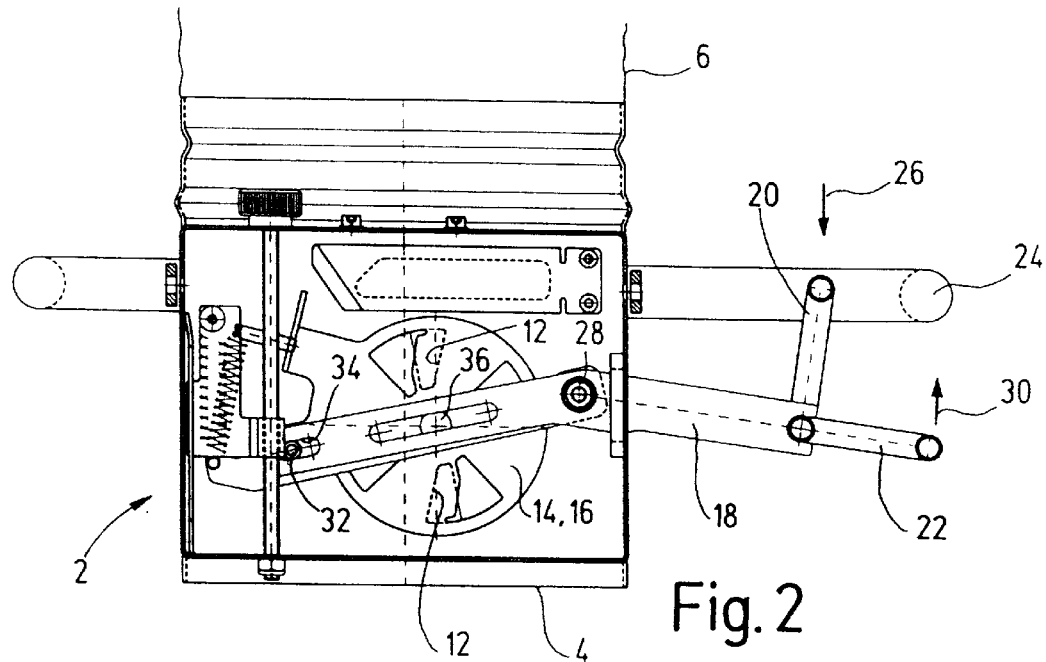
FIG. 2, a partially cut plan view of a vacuum manipulating device in FIG. 1, viewed in the direction of the arrows II—II.
Figure 1:
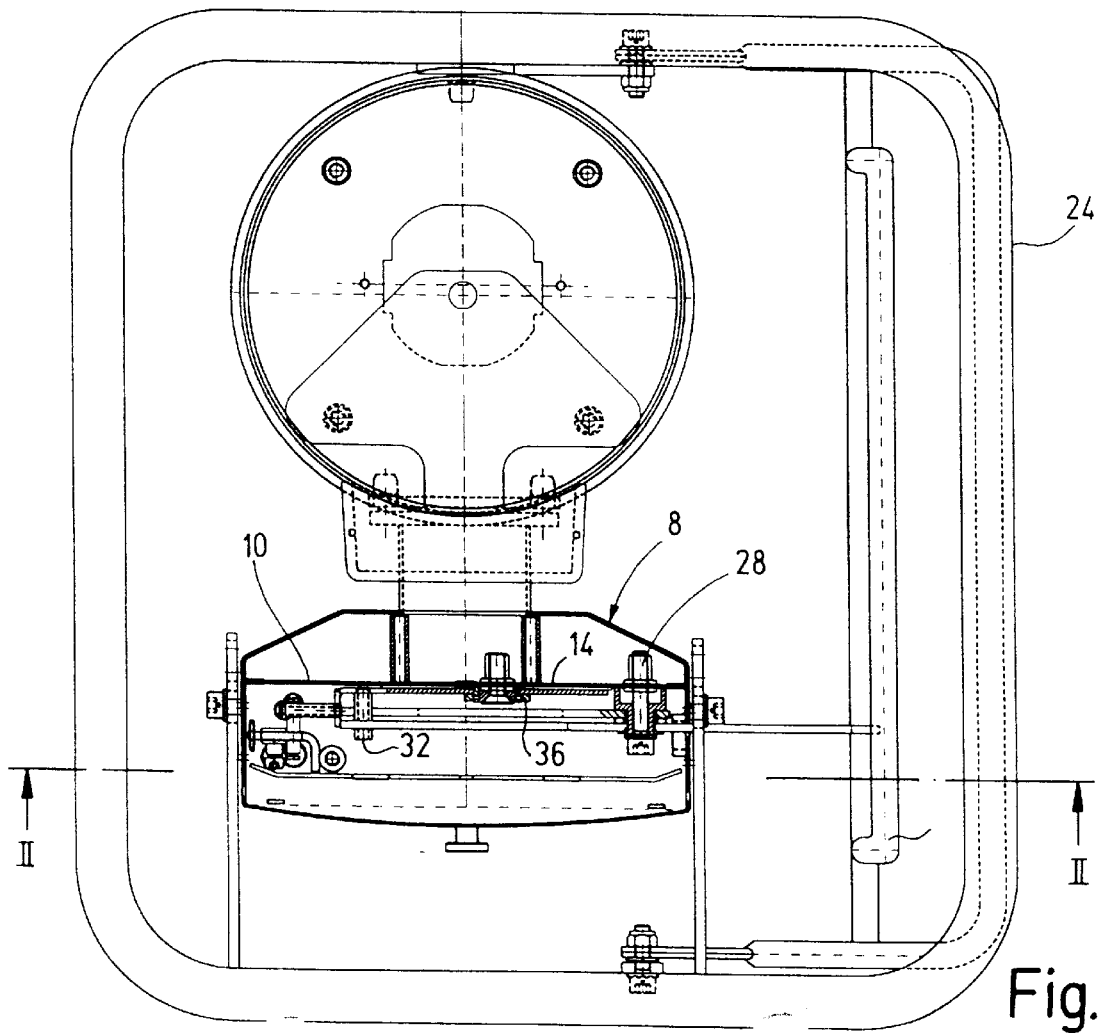
FIG. 1, a partially cut plan view of a vacuum manipulating device in accordance with the invention.
Figure 3:
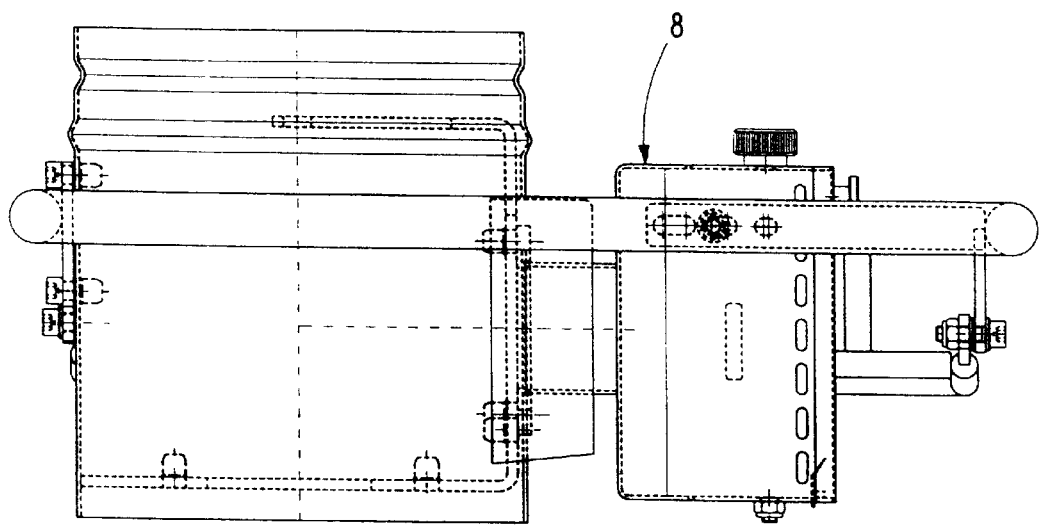
FIG. 3, a lateral view of the manipulating device in FIGS. 1, 2.
Figure 4:
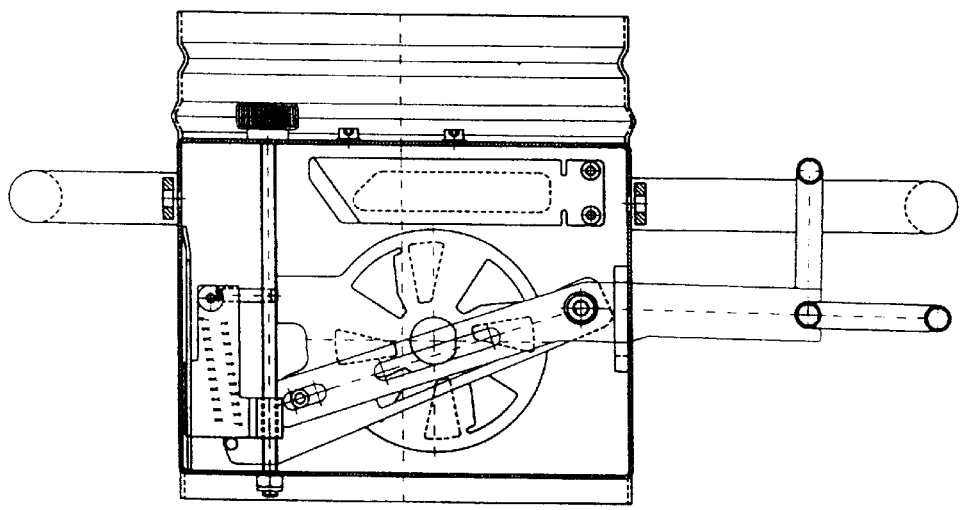
FIG. 4, a view corresponding to FIG. 2 with the control element pivoted in the blocking direction.

FIGS. 1 to 4 show different views of a vacuum manipulating device with a suction device 2 which holds an object to be lifted or transported by suction, by setting it on the latter with its underside 4. The suction device 2 can be connected via a lifting hose 6 to a dive, not shown, for generating a vacuum. A control valve 8 is housed in the interior of the suction device 2. It comprises openings 12 formed in a wall 10, which can be unblocked, or respectively entirely or partially blocked by a rotatable, disk-shaped control element 14. The control element 14, identified in what follows as control disk 16, can be rotated in the one or the other direction by means of a manually operable actuating lever 18. The free end of the actuating lever 18 has a first actuating arm 20 and a second actuating arm 22, which extend at approximately right angles with respect to each other. By means of his hand grasping a handle 24 extending in the form of a hoop, a user of the vacuum manipulating device is able to push the actuating arm 20 downward in the direction of the arrow 26 with his fingers, so that the actuating lever 18 is pivoted around its bearing 28 in a clockwise direction, or to pull up the actuating arm 22 in the direction of the arrow 30 toward the handle 24, so that the actuating lever 18 is pivoted counterclockwise. The control disk 16 has a pin 32, which will be described in more detail later, which engages the actuating lever 18 through an opening 34, formed in the shape of an elongated hole. The control disk 16 can therefore be turned around its rotatable bearing 36 in the course of pivoting the actuating lever 18.

The functioning of the control valve device 8 will be described in what follows by means of FIGS. 5 to 7. As already mentioned, the control disk 16 has a pin 32, which engages the opening 34 in the actuating lever 18, so that the control disk 16 can be turned in the one or the other direction by pivoting the actuating lever 18. In the non-actuated state of the actuating lever 18, the pin 32 acts as a detent area 38, with which the control disk 16 rests against a component 40, which itself is movable. The movable component 40 comprises a pivot lever 42, which is also pivotable around the bearing 28 of the actuating lever 18. The control disk 16 is prestressed via a tension spring 44 against the pivot lever 42, so that it always tries to rest against the narrow side of the pivot lever 42 with its detent area 38.

The pivot lever 42 itself is prestressed by means of a tension spring 46 against an adjustable positive stop 48, which can be displaced by means of a threaded spindle 50 in the direction of the arrow 52. The position of the positive stop 48 in the direction of the arrow 52 set by means of the threaded spindle 50 defines the neutral position of the control disk 16 in the non-actuated state of the control lever 18. A definite degree of overlapping of the openings 12 with openings 54 in the control disk 16 is achieved by means of this. As a result, a definite vacuum is built up in the interior of the suction device 2, or respectively in the lifting hose 6 which, as a function of the weight of the suction device 2 and of an object possibly adhering to it by suction, leads to a defined lifting height.

Figure 5:
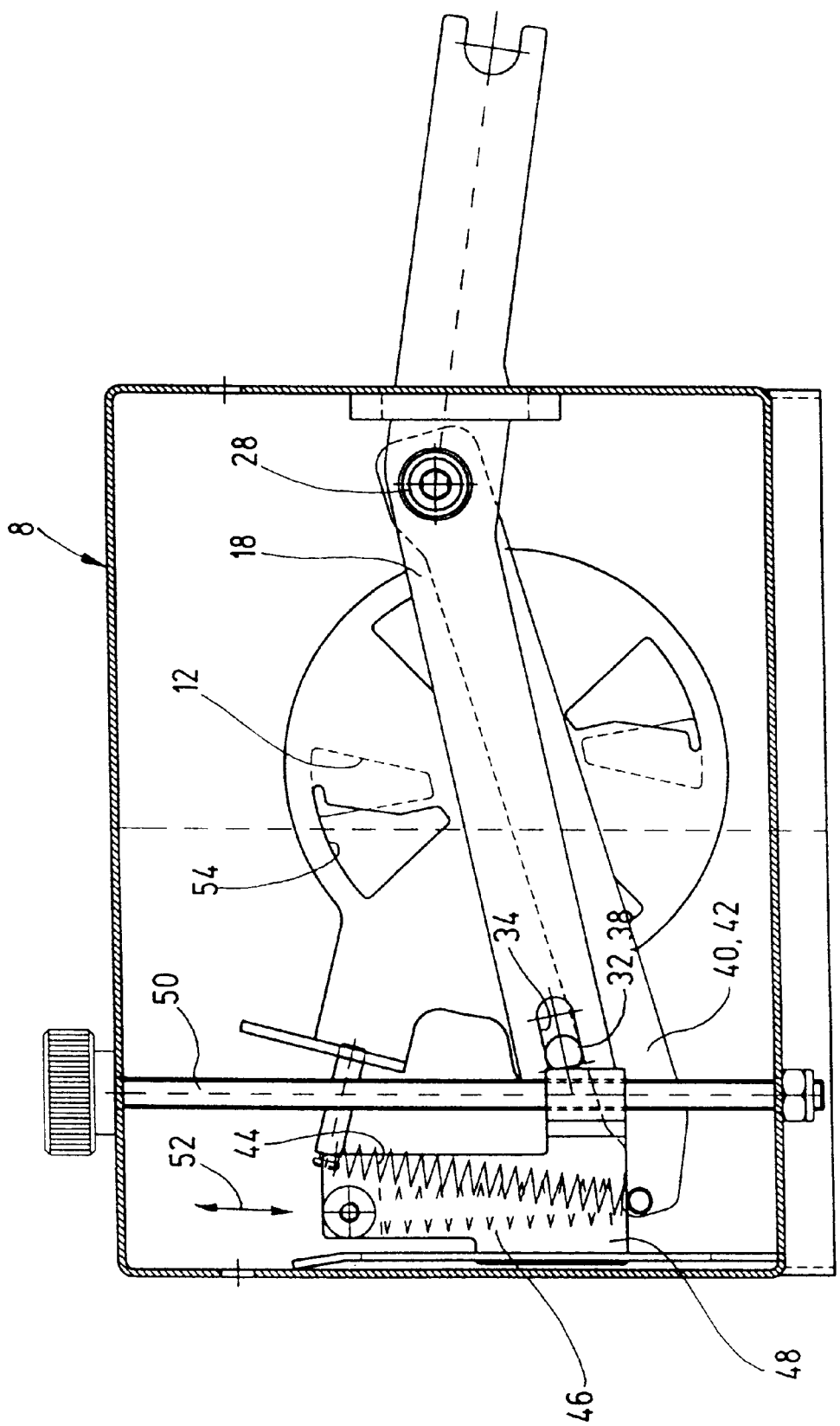
FIG. 5, a plan view into the interior of a control valve arrangement of the vacuum manipulating device in accordance with FIGS. 1 to 4 in the non-actuated state of the control element.
Figure 6:
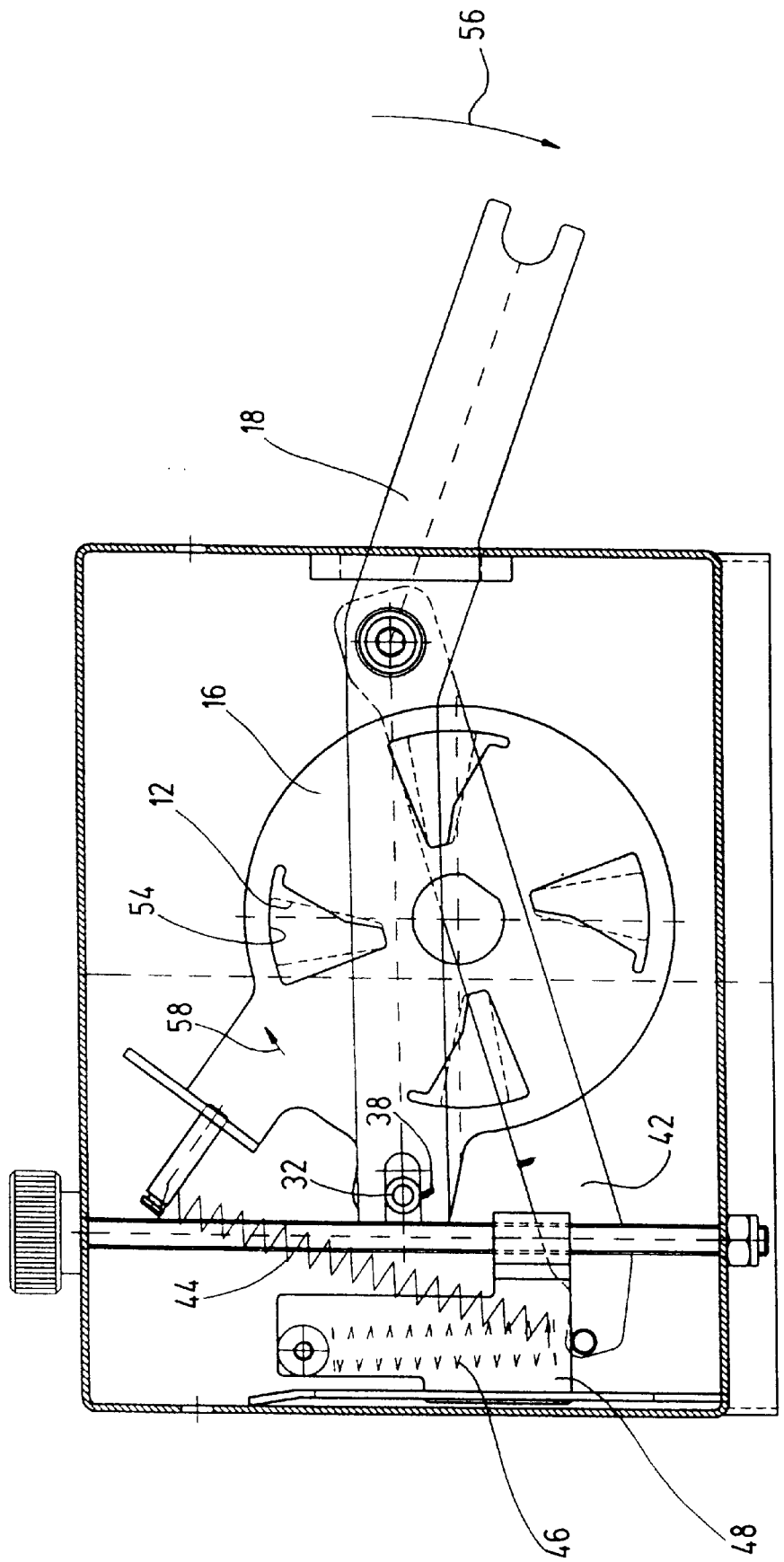
FIG. 6, a plan view corresponding to FIG. 5 of the control valve arrangement with the control element actuated in the unblocking direction.

The neutral position represented in FIG. 5 is a result of the following. When letting the actuating lever 18 go, the pivot lever 42 is placed against the lower edge of the positive stop 48 by the action of the spring 46. Simultaneously the control disk 16 is rotated by the action of the spring 44 in such a way that its detent area 38 rests against the lateral edge of the pivot lever 42. This neutral position defined by the resting of the above mentioned components against each other is well defined regardless of whether previously the control disk was in a farther opened position represented in FIG. 6, or in a farther closed position represented in FIG. 7.

If, starting from the neutral position in FIG. 5, the actuating lever 18 is pivoted in the direction of the arrow 56 (FIG. 6), the pin 32 of the control disk 16 is taken along, so that the control disk 16 is pivoted in a clockwise direction 58. The overlapping of the openings 12 with the openings 54 in the control disk 16 is almost maximal in FIG. 6. If, as just described, the pin 32, or respectively the detent area 38 is pivoted away in the direction of the arrow 58 from the pivot lever 42, the latter remains at rest against the positive stop 48. When letting the actuating lever 18 go, the control disk 16 is again rotated by the force of the spring 44 into its neutral position represented in FIG. 5, in which the detent area 38 again rests against the pivot lever 42.

Figure 7:
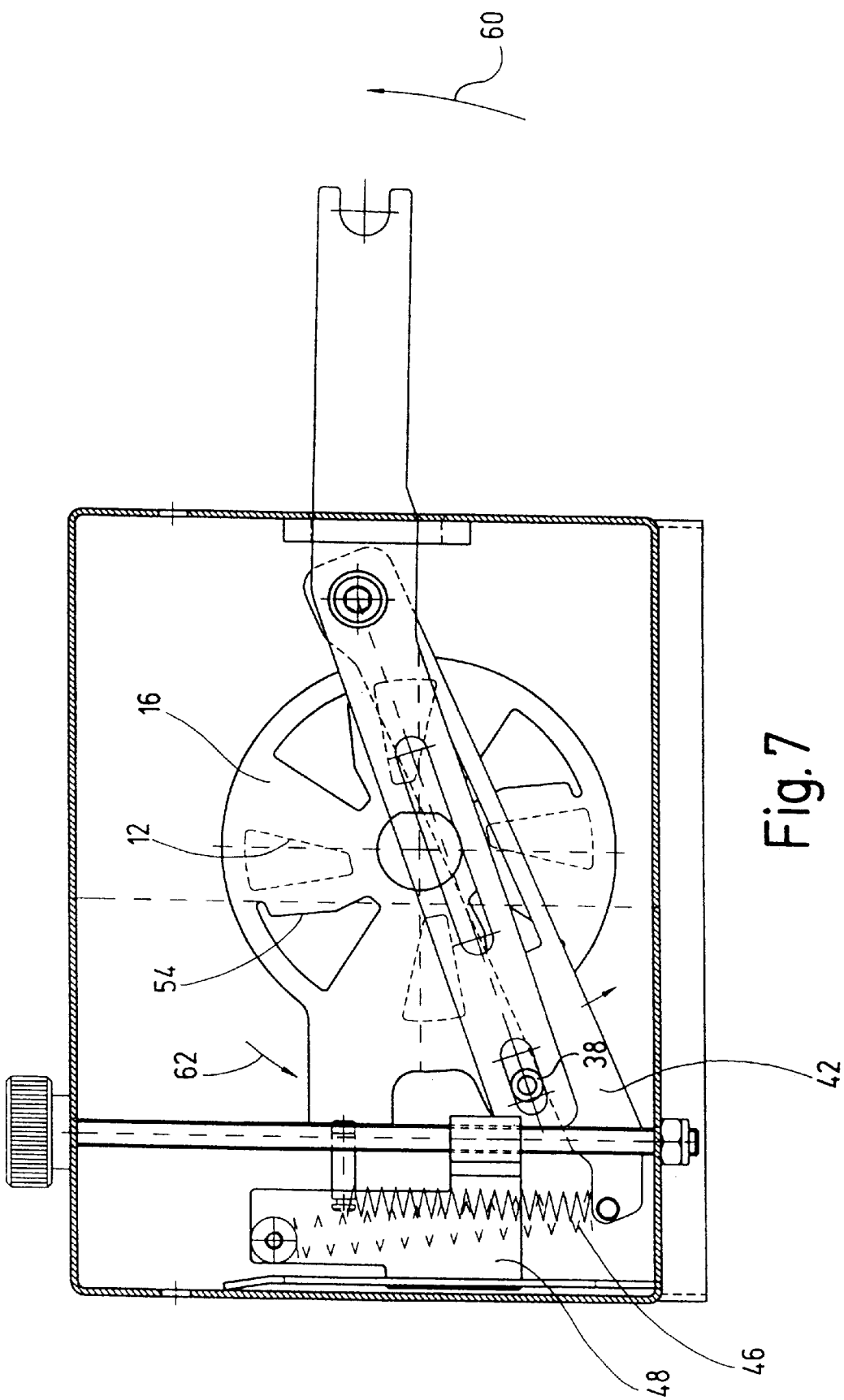
FIG. 7, a plan view corresponding to FIG. 5 of the control valve arrangement with the control element actuated in the blocking direction.

If, in accordance with FIG. 7, the actuating lever 18 is pivoted in the direction of the arrow 60, the control disk 16 is rotated in a counterclockwise direction 62. By means of this a pivot moment is exerted via the detent area 38 also on the pivot lever 42, so that it moves against the effect of the tension spring 46 into the position represented in FIG. 7. The degree of overlapping of the openings 12 and the openings 54 in the control disk 16 in the case represented in FIG. 7 is zero, so that in this position a maximum lifting force can be exerted on the object to be lifted. When releasing the actuating lever 18, the pivot lever 42 is again placed against the lower edge of the positive stop 48 by the effect of the spring 46, and because of the resting of the detent area 38 against the pivot lever 42, the control disk 16 is rotated back into the neutral position represented in FIG. 5.

What is claimed is:

1. A vacuum manipulating device, comprising a suction device connected by a lifting hose with a source of vacuum, said suction device creating a suction on an object to be lifted or transported, said suction device including:

a control valve device with an opening which is blocked and unblocked for controlling the vacuum prevailing in the interior of said suction device;

a pivotably mounted control element for effecting the blocking and unblocking of said opening, said pivotably mounted control element defining a detent area, and a neutral position for controlling the degree of opening of said opening;

a force-guided movable component against which said control element is prestressed in such a way that said control element rests against said force-guided movable component with said detent area when in said neutral position;

a spring, one end of which is fixed in place on said force-guided movable component; and an adjustable positive stop, which defines the degree of opening in said neutral position, wherein:

said control element is prestressed against said force-guided movable component by said spring, said force-guided movable component rests against said adjustable positive stop in said neutral position when said control element is pivoted in one direction; and said control element moves with said detent area said movable component away from said adjustable positive stop from its prestress when said control element is pivoted in the opposite direction of said one direction.

2. The vacuum manipulating device of claim 1, wherein said suction device further includes:

a further spring, one end of which is fixed in place on said adjustable positive stop, and wherein said movable component is prestressed against said adjustable positive stop by said further spring.

3. The vacuum manipulating device of claim 2, wherein said further spring is a helical spring.

4. The vacuum manipulating device of claim 1, wherein said spring is a helical spring.

5. The vacuum manipulating device of claim 1, wherein said force-guided movable component is pivotably hinged.

6. The vacuum manipulating device of claim 5, wherein said force-guided movable component comprises a pivot lever, said pivot lever being arranged such that the contact point of said detent area on said pivot lever, the pivot point of said pivot lever, and the pivot point of said control element lie on the same line.

7. The vacuum manipulating device of claim 6, wherein said pivot lever is manually operated.

8. The vacuum manipulating device of claim 7, wherein said pivot lever acts on said detent area.

9. The vacuum manipulating device of claim 1, wherein said control element includes a protrusion which projects transversely with respect to the plane of said control element.

10. The vacuum manipulating device of claim 9, wherein said protrusion comprises a pin.

11. The vacuum manipulating device of claim 9, wherein said protrusion defines said detent area.

12. The vacuum manipulating device of claim 9, wherein said suction device further includes:

an actuating lever defining an opening in the shape of an elongated hole through which said protrusion extends for movement in either direction of the elongation when said control element is moved.

13. The vacuum manipulating device of claim 5, wherein the pivot point of said force-guided movable component and the pivot point of said actuating lever coincide.

14. The vacuum manipulating device of claim 1, wherein said adjustable positive stop is displaced in the plane of rotation of said control element.

15. The vacuum manipulating device of claim 14, wherein said suction device further includes:

a threaded spindle, wherein said adjustable positive stop is displaced by said threaded spindle.

16. A vacuum manipulating device, comprising a suction device connected by a lifting hose with a source of vacuum, said suction device creating a suction on an object to be lifted or transported, said suction device including:

a control valve device with an opening which is blocked and unblocked for controlling the vacuum prevailing in the interior of said suction device;

a pivotably mounted control element for effecting the blocking and unblocking of said opening, said pivotably mounted control element defining a detent area, and a neutral position for controlling the degree of opening of said opening;

a force-guided movable component against which said control element is prestressed in such a way that said control element rests against said force-guided movable component with said detent area when in said neutral position;

a first spring, one end of which is fixed in place on said adjustable positive stop;

a second spring, one end of which is fixed in place on said force-guided movable component; and an adjustable positive stop, which defines the degree of opening in said neutral position, wherein:

said movable component is prestressed against said adjustable positive stop by said first spring, said control element is prestressed against said force-guided movable component by said second spring, said force-guided movable component rests against said adjustable positive stop in said neutral position when said control element is pivoted in one direction, and said control element moves with said detent area said movable component away from said adjustable positive stop from its prestress when said control element is pivoted in the opposite direction of said one direction.

* * * * *